No. 748,293.  PATENTED DEC. 29, 1903.
P. E. LE FEVRE.
BUNDLE CARRIER.
APPLICATION FILED AUG. 31, 1903.
NO MODEL.
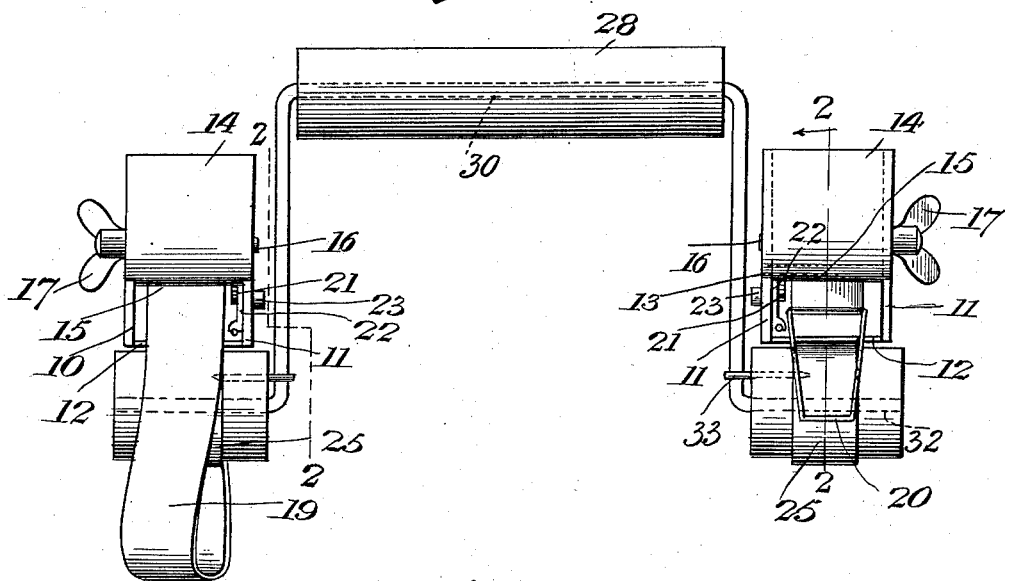
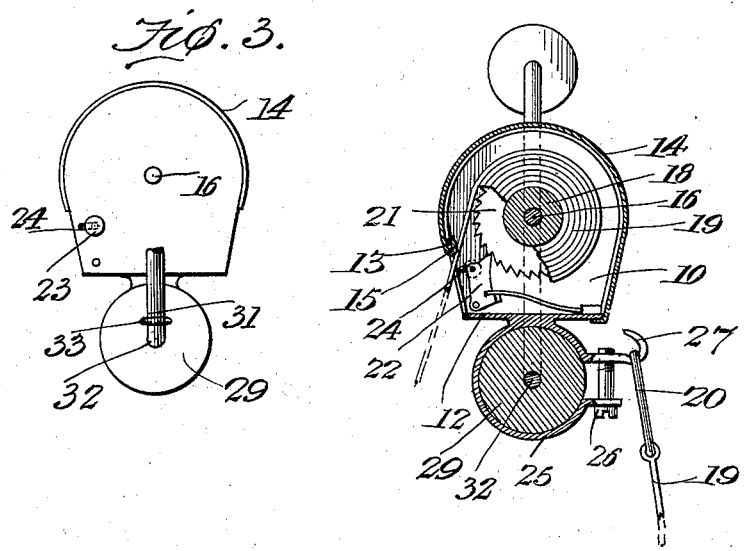
Witnesses
E. F. Stewart
C. N. Woodward
P. E. LeFevre, Inventor.
by C. A. Snow & Co.
Attorneys No. 748,293. Patented December 29, 1903.

UNITED STATES PATENT OFFICE.

PETER E. LE FEVRE, OF ROSENDALE, WISCONSIN.

BUNDLE-CARRIER.

SPECIFICATION forming part of Letters Patent No. 748,293, dated December 29, 1903.

Application filed August 31, 1903. Serial No. 171,438. (No model.)

*To all whom it may concern:*

Be it known that I, PETER E. LE FEVRE, a citizen of the United States, residing at Rosendale, in the county of Fond du Lac and State of Wisconsin, have invented a new and useful Bundle-Carrier, of which the following is a specification.

This invention relates to devices for supporting bundles of various sizes from a supporting means—such as the connecting-handle, the handle-bars, or other portions of a bicycle or parts of automobiles and similar vehicles—and has for its object to produce a simply-constructed and easily applied and operated device which may be quickly attached and detached and adapted for any size or shape of bundle; and the invention consists in certain novel features of construction, as hereinafter shown and described, and specified in the claim.

In the drawings, in which corresponding parts are denoted by like designating characters, Figure 1 is a front elevation. Fig. 2 is a sectional elevation taken on the line 2 2 in Fig. 1. Fig. 3 is an elevation from the inside of one of the tape-holding casings detached.

The improved device comprises generally two inclosing casings containing tape-winding drums and spaced apart and secured to a suitable support—such as a carrying-handle, the handle-bars of a bicycle, some portion of an automobile or other vehicle, or other suitable support—and as both casings are precisely alike corresponding parts are denoted by like reference characters.

The casings are formed with spaced end members 10 11, connected by integral bottom members 12 and connected intermediately at one side by transverse bars 13. The sides and tops of the casings are each formed of a single metal strip or sheet 14, folded at one end at 15 around the bars 13 and with their other ends bent beneath the bottoms 12 at the other side, as shown.

The end members 10 11 are provided with lateral flanges turned thereon, against which the edges of the sheet or plate 14 rest and to which the latter will preferably be soldered, brazed, or otherwise secured.

Mounted for rotation through each of the casings is a shaft 16, having operating members, preferably in the form of wing-nuts 17.

Within the casings each of the shafts is provided with a drum 18, to each of which one end of a tape 19 is attached, the free ends of the tapes being provided with rings or loops 20, as shown.

Each of the tape-drums will be provided with a ratchet-wheel 21, partaking of its motion and also of the motion of the shafts.

Each ratchet-wheel will also have associated therewith a holding-pawl 22, mounted to swing upon the casing and operative exteriorly thereof by a pin 23, extending through a slot 24 in the casings, as shown.

Connected to the bottom of each casing is a clip formed of a band 25, bent to shape and with its ends turned off from the band and united by a clamp-screw 26, by which the bands may be pinched firmly to the supporting means.

One of the ends of each of the clip members is extended into a hook 27 to receive the rings or loops 20 of the tapes, as shown.

In operation the clips may be connected with the handle-bar or some other part of a bicycle or in any other position where the presence of a bundle-carrier may be desired, or they may be connected with a carrier-handle 28, as shown in Fig. 1. When connected with the carrier-handle, the clips are first clamped upon plugs 29, of wood or other suitable material, as shown in Fig. 2. The handle 28 is penetrated by a wire 30, having downwardly-extending arms 31, the lower ends of which are bent outwardly and extended through openings 32, formed longitudinally in the plugs 29. The arms 31 are then secured to said plugs by means of staples 33 or other suitable fastening means. When thus disposed, the device is adapted to be used as a shawl-strap or bundle-carrier to be carried by hand.

The casings, with their drums and tapes, will generally be employed in pairs, as illustrated, but may be employed singly or in groups of three or more, as required, without departing from the principle of the invention.

The casings and other parts may be of any required size and employed for supporting any size or form of package or bundle to which they are adapted and will be found a very convenient and useful device for the purposes designated.

Having thus described the invention, what I claim is—

In a device of the class described, a pair of casings, each having a winding-drum, a ratchet-wheel upon said drum, a spring-actuated pawl engaging said ratchet-wheel, a pin extending from said pawl and through the slot in the end of the casing and operable to release said pawl from the ratchet-wheel, a tape connected with the drum, extending through the front of the casing and having an attaching-loop, and means for rotating the drum, said casings being provided with clamping devices having hook members, in combination with plugs engaged by said clamping devices, a handle member, arms connected with the latter and having ends extending longitudinally through the plugs held by the clamping devices, and means for connecting said arms with said plugs.

In testimony that I claim the foregoing as my own I have hereto affixed my signature in the presence of two witnesses.

PETER E. LE FEVRE.

Witnesses:
 A. W. MARCHANT,
 FRANK BOWE.